US008857601B2

(12) United States Patent  (10) Patent No.: US 8,857,601 B2
Taylor et al.  (45) Date of Patent: Oct. 14, 2014

(54) SLIP CONVEYOR ASSEMBLY

(75) Inventors: Alfred Alexander Taylor, Lugarno (AU); Garry Ronald MacKay, Lidcombe (AU)

(73) Assignee: TNA Australia Pty Limited (AU)

( * ) Notice: Subject to any disclaimer, the term of this patent is extended or adjusted under 35 U.S.C. 154(b) by 767 days.

(21) Appl. No.: 11/263,762

(22) Filed: Oct. 31, 2005

(65) Prior Publication Data

US 2006/0090985 A1 May 4, 2006

(30) Foreign Application Priority Data

Nov. 1, 2004 (AU) ................................ 2004906287

(51) Int. Cl.
*B65G 27/12* (2006.01)
*B65G 27/32* (2006.01)
*B65G 27/34* (2006.01)

(52) U.S. Cl.
CPC ............... *B65G 27/34* (2013.01); *B65G 27/12* (2013.01); *B65G 27/32* (2013.01)
USPC ....................................... 198/750.1; 198/758

(58) Field of Classification Search
USPC .............. 198/750.11, 750.8, 762, 766, 752.1, 198/753, 758, 750.1, 750.2
See application file for complete search history.

(56) References Cited

U.S. PATENT DOCUMENTS

| 2,445,175 | A | * | 7/1948 | Hittson ............................. 74/61 |
| 3,814,370 | A | * | 6/1974 | Hurwitz ......................... 248/564 |
| 3,817,370 | A | * | 6/1974 | Cox ............................... 198/579 |
| 3,917,050 | A | * | 11/1975 | Gregor ........................... 198/358 |
| 5,046,602 | A | * | 9/1991 | Smalley et al. ............ 198/750.8 |
| 5,183,143 | A | | 2/1993 | Sullivan, Jr. |
| 5,934,446 | A | | 8/1999 | Thomson |
| 6,168,010 | B1 | * | 1/2001 | Komatsu ....................... 198/751 |
| 6,230,875 | B1 | | 5/2001 | Carlyle |
| 2002/0125109 | A1 | * | 9/2002 | Ikeda et al. ................ 198/752.1 |
| 2002/0130015 | A1 | * | 9/2002 | Jones et al. .................... 198/617 |

FOREIGN PATENT DOCUMENTS

| DE | 3731612 A1 | * | 4/1989 |
| EP | 593234 A1 | | 4/1994 |
| GB | 2272196 A | | 5/1994 |

* cited by examiner

*Primary Examiner* — Kavel Singh
(74) *Attorney, Agent, or Firm* — Kilpatrick Townsend & Stockton LLP

(57) ABSTRACT

A slip conveyor assembly 10 is disclosed. The assembly 10 includes six slip conveyors 11 to 16 being arranged in series. Each of the conveyors 11 to 16 includes a tray 18 of "U" transverse cross-section. Each tray 18 is operated by a drive assembly 19 that horizontally reciprocates (oscillates) the associated tray 18 to cause product to advance along the assembly 10. Adjacent trays 18 may be displaced so that there is a gap between adjacent trays through which product may be delivered.

16 Claims, 3 Drawing Sheets

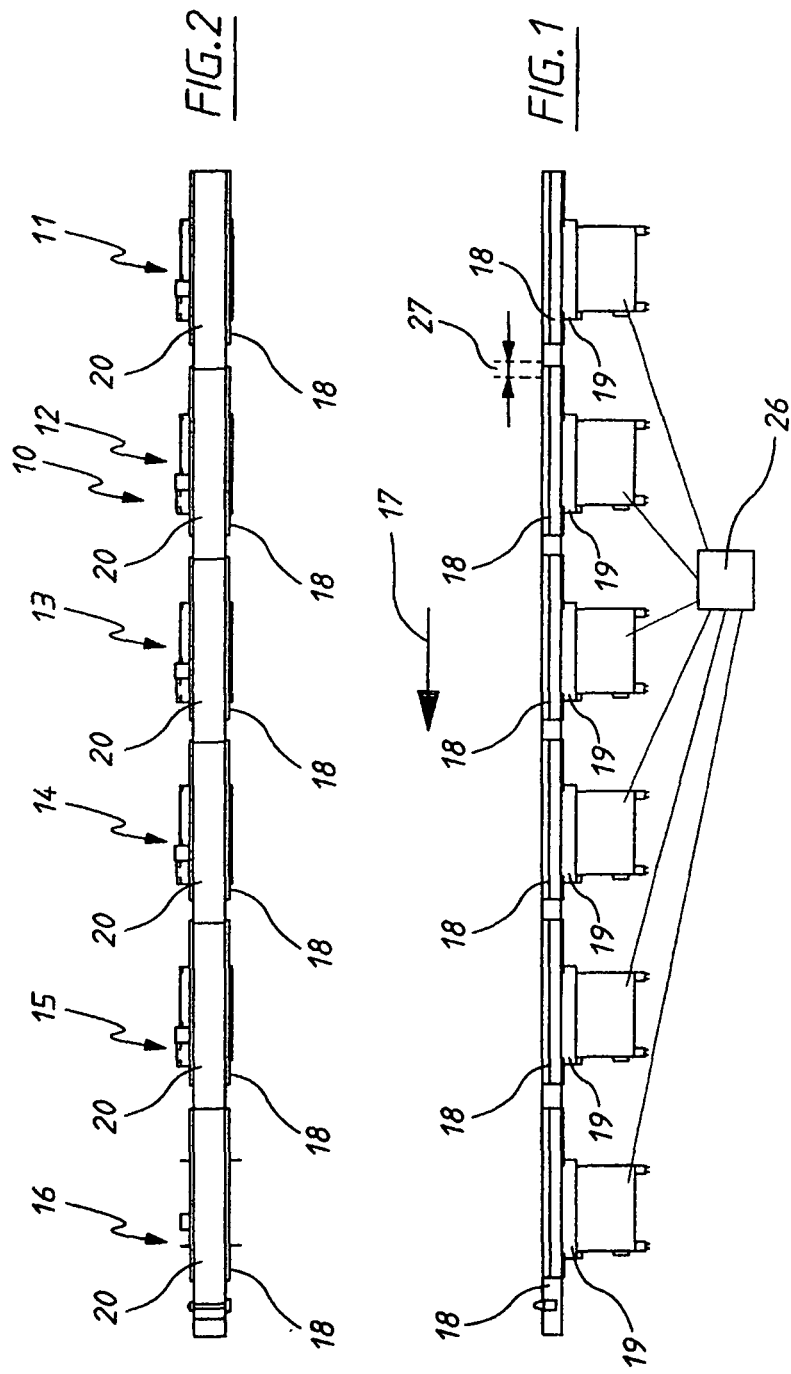

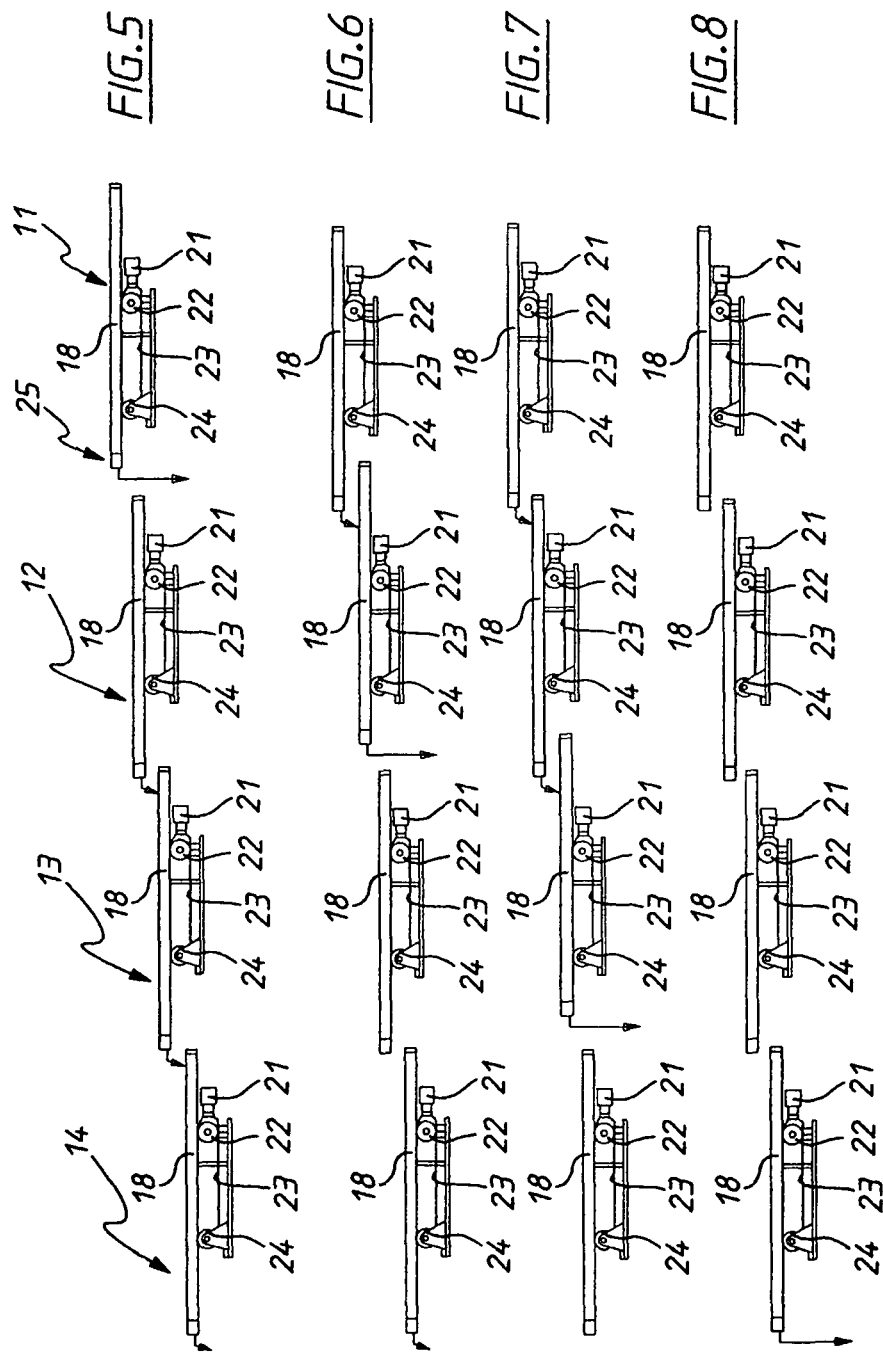

SLIP CONVEYOR ASSEMBLY

TECHNICAL FIELD

The present invention relates to slip conveyors and more particularly but not exclusively to slip conveyors used to convey product to packaging machines.

BACKGROUND OF THE INVENTION

In the packaging of snack foods as well as other products it is not uncommon for a considerable number of packaging machines and their associated weighing apparatus to receive product from a conveyor assembly. Such a packaging machine is disclosed in U.S. Pat. No. 4,663,917. Typically, the conveyor assembly will have gates along its length with product taken from each gate and delivered to an associated one of the packaging machines. These conveyors with their gate assemblies are complex. Accordingly they are generally expensive, difficult to maintain and in particular difficult to clean. This is a major issue where the product is a food.

A known type of conveyor is a slip conveyor. A slip conveyor includes a longitudinally extending tray with a surface along which the product is conveyed. The tray is longitudinally and in some instances also vertically reciprocated (oscillated) to cause the product to move from an upstream position to a downstream position on the tray. It is known to use slip conveyors in series. The trays are located so that the upstream end of one tray is located beneath the downstream end of the next adjacent upstream tray so that product is conveyed therealong. Product is removed from the conveyor assembly by displacing one of the trays so that there is no longer an overlap. Accordingly product then falls between the two adjacent trays. Such arrangements overcome the need for gates. However these arrangements have a number of disadvantages, including positioning of the trays where there is a significant number of trays arranged in the assembly. In particular, if a number of trays are activated, appropriate gaps between adjacent trays may not occur.

Slip (vibratory) conveyors are described in U.S. Pat. Nos. 5,042,643, 5,494,151, 5,777,232, 5,804,733, 5,865,297, 6,044,710, 6,206,180, 6,318,542, 6,374,985 and 6,457,577, as well as US patent applications 2002/0125109 and 2004/0112715.

The conveyors described in the above-mentioned US patents and patent applications do not address the above-mentioned problem associated with assemblies including a plurality of trays (conveyors).

SUMMARY OF THE INVENTION

It is an object of the present invention to overcome or substantially ameliorate the above disadvantage.

There is disclosed herein a slip conveyor assembly including:

at least two slip conveyors arranged in series so that product delivered to an upstream one of the conveyors can be delivered to each downstream one of the conveyors, each conveyor having:

a longitudinally extending conveyor tray with a longitudinally extending conveyor surface along which product is conveyed by longitudinal reciprocation of the tray and therefore the surface thereof, with at least one of the trays being locatable in a first longitudinal position and a second longitudinal position, and a drive assembly attached to each tray to cause the longitudinal reciprocation thereof and displacement of the at least one of the trays between the first and second positions, the conveyor assembly further including:

a control assembly operatively associated with each drive assembly, the control assembly providing for selective operation of the conveyors so that the at least one of the trays can be moved between the first and second positions thereof, and to cause the reciprocation of the trays, with the displacement between an adjacent pair of trays when the at least one of the trays is displaced to the second position thereof being such that there is a gap between the trays of the pair through which gap product is delivered from the conveyor assembly; and wherein the control assembly is configured to cause the tray upstream of the gap to reciprocate with a first amplitude while causing the tray downstream of the gap to reciprocate at a reduced amplitude relative to the first amplitude.

Preferably, the reduced amplitude is a zero amplitude.

Preferably, each tray is movable longitudinally between a first and a second position to create gaps between adjacent trays with the control assembly being configured so that each tray immediately upstream of a gap is reciprocated at the first amplitude and each tray immediately downstream of a gap is reciprocated at the reduced amplitude.

Preferably, with respect to each tray, the second position is upstream of the first position, with each tray immediately upstream of a gap being in the second position thereof.

In an alternative form, with respect to each tray, the second position is downstream of the first position, with each tray immediately upstream of a gap being in the second position thereof.

Preferably, each drive assembly includes a belt attached to the associated tray, an electric motor operatively associated with the belt to cause reciprocation thereof.

Preferably, each belt is a loop, with each belt passing between a pair of associated pulleys, with one of the pulleys being driven by the motor.

Preferably, when reciprocated each tray moves through a stroke, with the tray downstream of a gap being displaced downstream to approximately the extremity of the stroke.

Preferably, the control assembly operates each drive assembly so that the trays reciprocate in phase.

There is further disclosed herein a method of conveying product, the method including the steps of:

providing at least two upwardly facing longitudinally extending conveyor surfaces that are horizontally reciprocated to convey product along the surfaces;

displacing one of the surfaces longitudinally relative to a next adjacent surface so that a gap exists between the surfaces through which product is to be delivered; and reciprocating the surface immediately upstream of the gap with a first amplitude while reciprocating the surface immediately downstream of the gap at a second amplitude, the second amplitude being less than the first amplitude.

Preferably, the surfaces are also vertically reciprocated

Preferably, one of the surfaces is moved upstream to provide the gap.

Preferably, when reciprocated each tray moves through a stroke, with the surface downstream of the gap being displaced downstream to approximately the extremity of the stroke.

Preferably, the trays are reciprocated in phase.

BRIEF DESCRIPTION OF THE DRAWINGS

A preferred form of the present invention will now be described by way of example with reference to the accompanying drawings.

FIG. 1 is a schematic side elevation of a conveyor assembly;

FIG. 2 is a schematic top plan view of the assembly of FIG. 1;

FIGS. 5 to 8 are schematic side elevations of portions of the assembly of FIG. 1.

DETAILED DESCRIPTION OF THE PREFERRED EMBODIMENT

Figure 3:
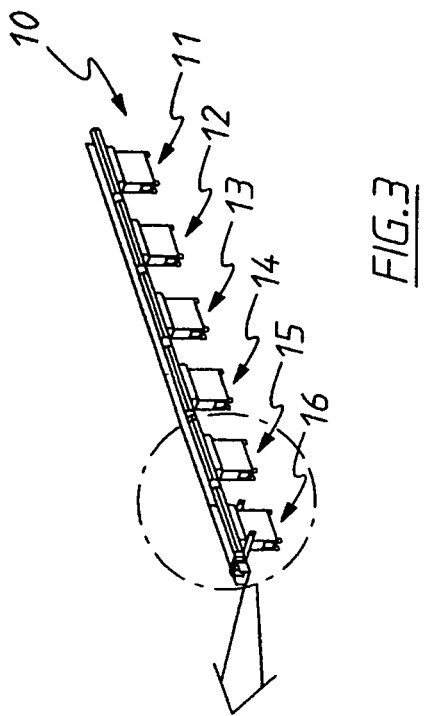
FIG. 3 is a schematic isometric view of the assembly of FIG. 1.
Figure 4:
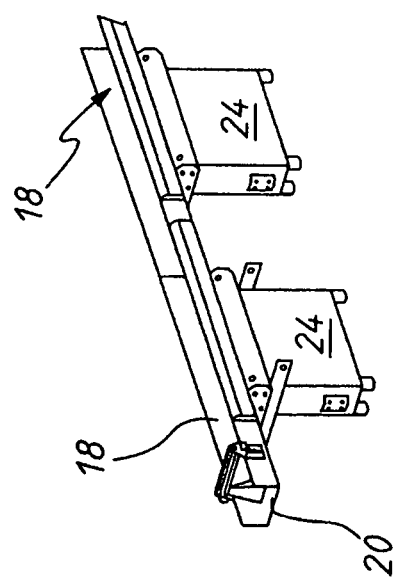
FIG. 4 is a schematic enlarged isometric view of a portion of the assembly of FIG. 3.

In the accompanying drawings there is schematically depicted a slip (vibratory) conveyor assembly 10. The assembly 10 consists of at least three slip conveyors. In the present embodiment, there are six slip conveyors 11, 12, 13, 14, 15 and 16. The conveyors 11 to 16 are arranged in series and are operated so that product can be conveyed in the direction of the arrow 17 from the upstream conveyor 11 to the downstream conveyors 16. Each conveyor 11 to 16 includes a tray 18 of "U" transverse cross-section extending longitudinally in the direction of the arrow 17. Each tray 18 includes an upwardly facing surface 20 that is also generally horizontally longitudinally extending and conveys the product in the direction of the arrow 17.

Each tray 18 is operated by a drive assembly 19 that horizontally reciprocates (oscillates) the associated tray 18 to cause product to advance along the surfaces 20.

Each drive assembly 19 includes an electric motor (servo motor) 21 that angularly drives a first pulley 22 to drive an endless belt 23. Each belt 23 passes about an "idler" pulley 24. Each motor 21 is operated to cause reciprocation of the belt 23 to thereby cause reciprocation (oscillation) of the associated tray 18.

Each conveyor 11 to 16 includes a computer 24 that controls operation of its associated motor 21. The computers 24 are electronically linked to a control assembly 26 so that operation of the motors 21 is coordinated.

With reference to FIG. 8, when product is being conveyed along a respective one of the surfaces 20, the tray 18 thereof is reciprocated about a generally central position. However, when product is to be removed from the assembly 10 this changes. For example with reference to FIG. 5, each of the trays 18 of conveyors 13, 14 is reciprocated about the generally central position illustrated. However, the conveyor 11 has its tray 18 displaced upstream (that is, in a direction opposite to the direction of the arrow 17) to an upstream position. While in this upstream position, the tray 18 of the conveyor 11 is reciprocated. Accordingly, product is being conveyed by the conveyors 11, 13 and 14. However because the tray 18 of the conveyor 11 is displaced from the tray 18 of the conveyor 12, there is a gap 25 through which product falls to be delivered to a further conveyor (not illustrated) that delivers the product to an associated weighing machine and packaging machine. With respect to the arrangement of FIG. 5, the conveyor 12 has its tray 18 stationary or alternatively reciprocated with a greatly reduced amplitude relative to the amplitude of the trays 18 of conveyors 11, 13 and 14. Accordingly the gap 25 is maintained and product is maintained stationary on the conveyor 12. In the arrangement of FIG. 6, the conveyor 12 has its tray 18 displaced in a direction opposite the direction of the arrow 17 and has the tray 18 of the conveyor 13 stationary while the trays 18 of conveyors 11, 12 and 14 are again reciprocated. In the arrangement of FIG. 7, it is the tray of conveyor 13 that is not reciprocated. With respect to the arrangement of FIG. 8, all conveyors 11 to 14 are operating so that product is delivered from the end of the conveyor 14.

Accordingly, the tray 18 of any of the conveyors 12 to 16, downstream of a gap 25, reciprocates at a reduced amplitude, which may be a zero amplitude. Accordingly a reduced amplitude includes within its scope a zero amplitude. For example in this embodiment, the conveyors 11 to 16 when conveying material each have their tray 18 reciprocate with an amplitude of 150 mm. In this respect, preferably the trays 18 would be reciprocated in unison so as to be in phase with the same stroke. Preferably the trays 18 have an overlap 27 of 20 mm with respect to adjacent trays 18. The upstream end of each tray 18 is located beneath the downstream end of the next upstream tray 18 so as to create the overlap 27.

As mentioned previously, each of the computers 24 is linked to a central control assembly (computer) 26 that determines which if any of the conveyors 11 to 16 would be moved to the upstream position thereof to provide a gap 25 downstream thereof.

With respect to the above-described embodiment, particularly with reference to FIGS. 5 to 8, only one of the conveyors 11 to 14 is displaced to the upstream position. However it is also possible to displace more than one of the conveyors 11 to 16 to the upstream position thereof. However, no more than every second conveyor 11 to 16 should be so displaced. For example with reference to FIG. 5, only the conveyor 11 is displaced to the upstream position thereof. However, in addition to that the conveyor 13 could also be displaced to the upstream position thereof and the conveyors 12 and 14 held stationary so as to not reciprocate and therefore not convey product. Accordingly a second gap 25 would exist between the conveyors 13 and 14.

In an alternative arrangement, a downstream conveyor 11 to 16, with respect to a gap 25, may be displaced to a downstream position thereof (and not reciprocated) to create a gap 25 immediately upstream.

Preferably, when each tray 18 is reciprocated it is moved through a stroke, with the tray 18 immediately downstream of a gap 25 displaced downstream to the extremity of the stroke.

The invention claimed is:

1. A slip conveyor assembly including:
   at least two slip conveyors arranged in series so that product delivered to an upstream one of the conveyors can be delivered to each downstream one of the conveyors, each conveyor having:
   a longitudinally extending conveyor tray with a longitudinally extending conveyor surface along which product is conveyed by longitudinal reciprocation of the tray and therefore the surface thereof,
   with at least one of the trays being locatable in a first longitudinal position and a second longitudinal position, and
   a drive assembly attached to each tray to cause the longitudinal reciprocation thereof, the drive assembly attached to said one of the trays being operable to displace said at least one of the trays between the first and second positions,
   said conveyor assembly further including:
   a control assembly operatively associated with each drive assembly, the control assembly controlling the drive assemblies to provide for selective operation of the conveyors so that the at least one of the trays is selectively movable between the first and second positions thereof, and to cause the reciprocation of the trays, with the displacement between an adjacent pair of trays when the at least one of the trays is displaced to the second position thereof being such that there is a gap between the trays of the pair through which gap product is delivered from the conveyor assembly; and wherein the control assembly is configured to cause the tray immediately upstream of the gap to reciprocate with a first amplitude while the tray immediately downstream of the gap reciprocates at a reduced amplitude relative to the first amplitude.

2. The conveyor assembly of claim 1 wherein, said reduced amplitude is a zero amplitude.

3. The conveyor assembly of claim 1 wherein, each tray is movable longitudinally between a first and a second position to create gaps between adjacent trays with said control assembly being configured so that each tray immediately upstream of a gap is reciprocated at said first amplitude and each tray immediately downstream of a gap is reciprocated at said reduced amplitude.

4. The conveyor assembly of claim 3 wherein, with respect to each tray, the second position is upstream of the first position, with each tray immediately upstream of a gap being in the second position thereof.

5. The conveyor assembly of claim 3 wherein, with respect to each tray, the second position is downstream of the first position, with each tray immediately upstream of a gap being in the second position thereof.

6. The conveyor assembly of claim 1 wherein, each drive assembly includes a belt attached to the associated tray, an electric motor being operatively associated with the belt to cause reciprocation thereof.

7. The conveyor assembly of claim 6 wherein, each belt is a loop, with each belt passing between a pair of associated pulleys, with one of the pulleys being driven by said motor.

8. The conveyor assembly of claim 7 wherein, when reciprocated each tray moves through a stroke, with the tray downstream of a gap being displaced downstream to approximately the extremity of said stroke.

9. The conveyor assembly of claim 8 wherein, the control assembly operates each drive assembly so that the trays reciprocate in phase.

10. A method of conveying product, said method including the steps of:

providing at least two upwardly facing longitudinally extending conveyor surfaces that are horizontally reciprocated to convey product along the surfaces;

displacing one of the surfaces longitudinally relative to a next adjacent surface so that a longitudinally extending gap exists between the surfaces through which product is to be delivered; and reciprocating the surface immediately upstream of the gap with a first amplitude while reciprocating the surface immediately downstream of the gap at a second amplitude, said second amplitude being less than said first amplitude.

11. The method of claim 10 wherein, the surfaces are also vertically reciprocated.

12. The method of claim 11 wherein, one of said surfaces is moved upstream to provide said gap.

13. The method of claim 12 wherein, when reciprocated each surface moves through a stroke, with said surface downstream of said gap being displaced downstream to approximately the extremity of the stroke.

14. The method of claim 13 wherein, the surfaces are reciprocated in phase.

15. The conveyor assembly of claim 1 wherein, in the first position the gap through which the gap product can be delivered from the conveyor assembly is not present and product can delivered from downstream along the conveyor surfaces of the at least two slip conveyors.

16. The method of claim 10 wherein, before displacing one of the surfaces the product can be delivered downstream along the conveyor surfaces.

* * * * *